United States Patent [19]
Goddard et al.

[11] Patent Number: 5,062,593
[45] Date of Patent: Nov. 5, 1991

[54] SOLID-PROPELLANT-POWERED MANEUVERING SYSTEM FOR SPACECRAFT

[75] Inventors: Charles W. Goddard, San Jose; John T. Lucas, Los Altos; Paul A. Galvan, San Jose, all of Calif.

[73] Assignee: United States Government as represented by the Secretary of the Navy, Washington, D.C.

[21] Appl. No.: 660,361

[22] Filed: Feb. 15, 1991

[51] Int. Cl.⁵ .................... B64G 1/26; F42B 15/033
[52] U.S. Cl. ............................... 244/169; 244/171; 244/170; 244/172; 244/3.22; 60/632; 60/39.47; 60/254
[58] Field of Search ............... 244/158 R, 164, 169, 244/172, 100 R, 122 AD, 3.22, 3.21; 60/632, 415, 634, 39.47, 254, 253

[56] References Cited

U.S. PATENT DOCUMENTS

| | | | |
|---|---|---|---|
| 2,903,600 | 9/1959 | Muirhead | 60/39.47 |
| 2,965,334 | 12/1960 | McCullough t al. | 244/169 |
| 2,986,005 | 5/1961 | Dudley | 60/632 |
| 3,304,724 | 4/1967 | Blumrich et al. | 60/257 |
| 3,592,215 | 11/1971 | Davis | 137/113 |
| 3,637,167 | 1/1972 | Froning Jr. et al. | 241/3.21 |
| 3,908,358 | 9/1975 | Sutton Jr. et al. | 60/254 |
| 4,074,527 | 2/1978 | Sadler | 60/632 |
| 4,384,690 | 5/1983 | Brodersen | 244/3.22 |
| 4,413,795 | 11/1983 | Ryan | 244/3.22 |
| 4,550,888 | 11/1985 | Douglass et al. | 244/3.22 |
| 4,655,417 | 4/1987 | Herndon | 244/122 AD |
| 4,687,158 | 8/1987 | Kettering | 244/100 R |

Primary Examiner—Galen Barefoot
Attorney, Agent, or Firm—Wayne O. Hadland; Kenneth L. Warsh; Robert Wohlfarth

[57] ABSTRACT

An improvement to a variable-pressure solid-propellant-powered maneuvering system for spacecraft, enabling the system to operate for longer than one propellant burn time. At least two solid propellant gas generators are connected via a manifold to a plurality of nozzle valve clusters; at least one of the gas generators is connected to the manifold via a sequence valve which isolates that generator from the manifold until such time as it is desired to put that generator into operation.

4 Claims, 6 Drawing Sheets

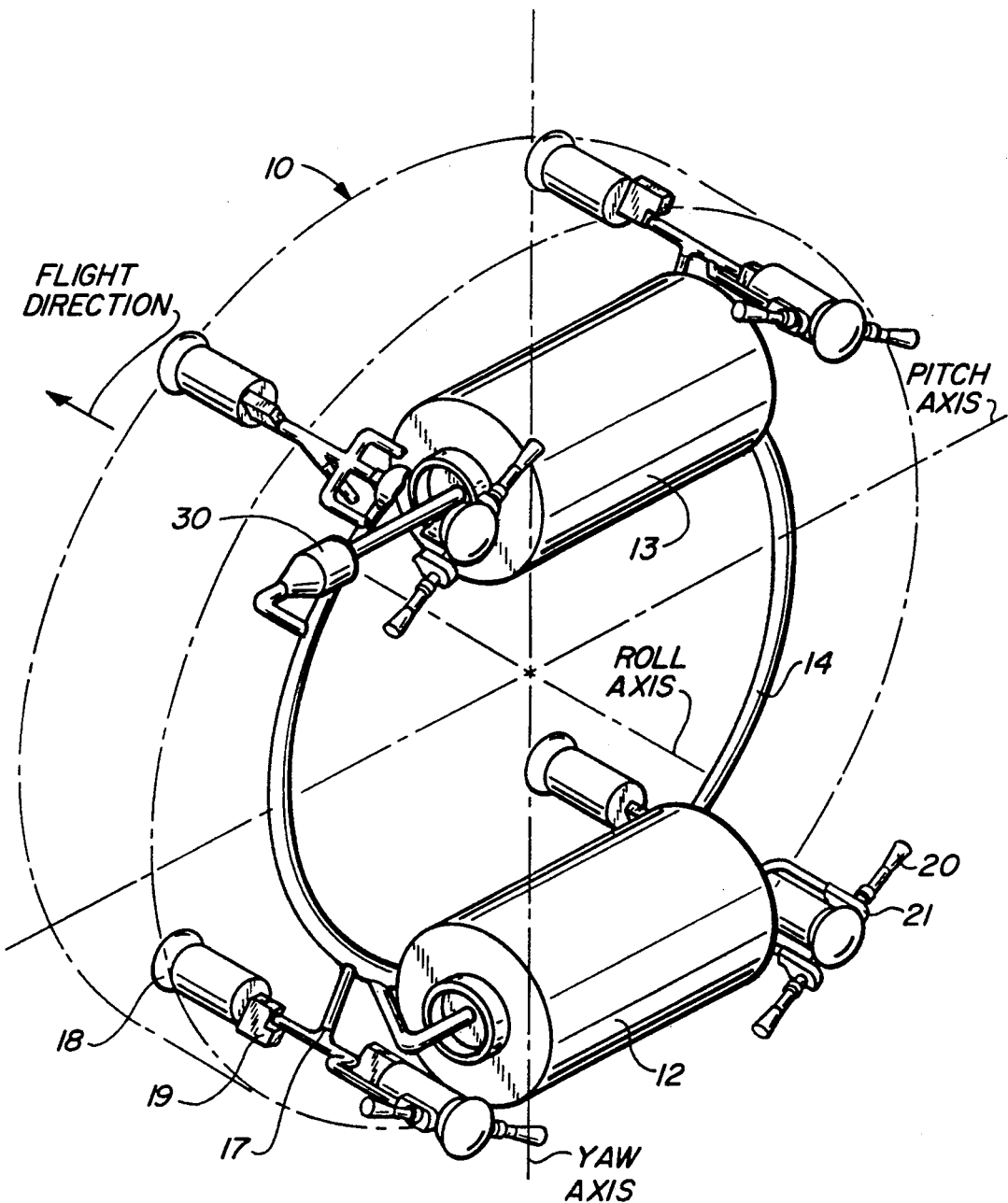
FIG._1

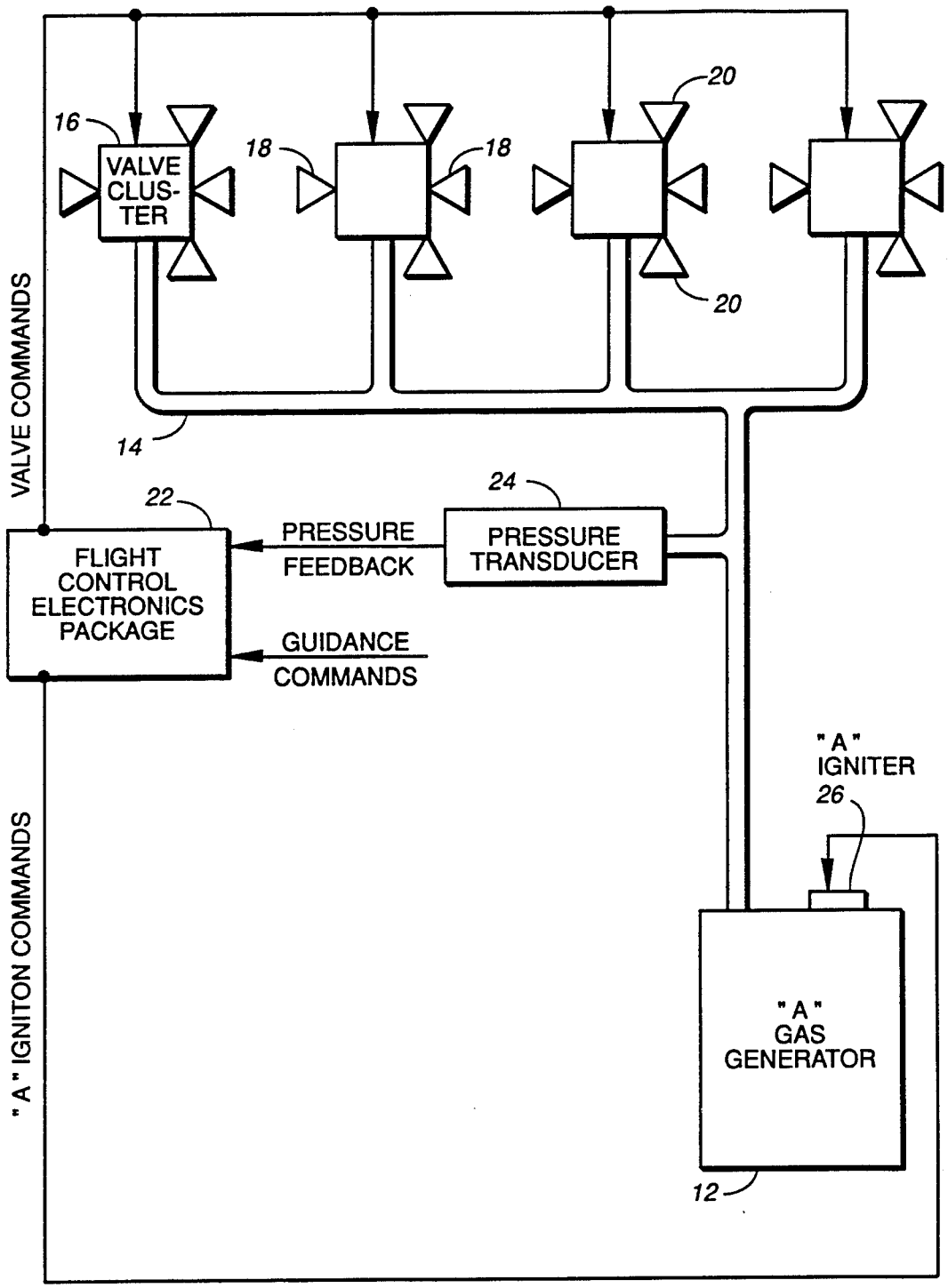
FIG._2 *(PRIOR ART)*

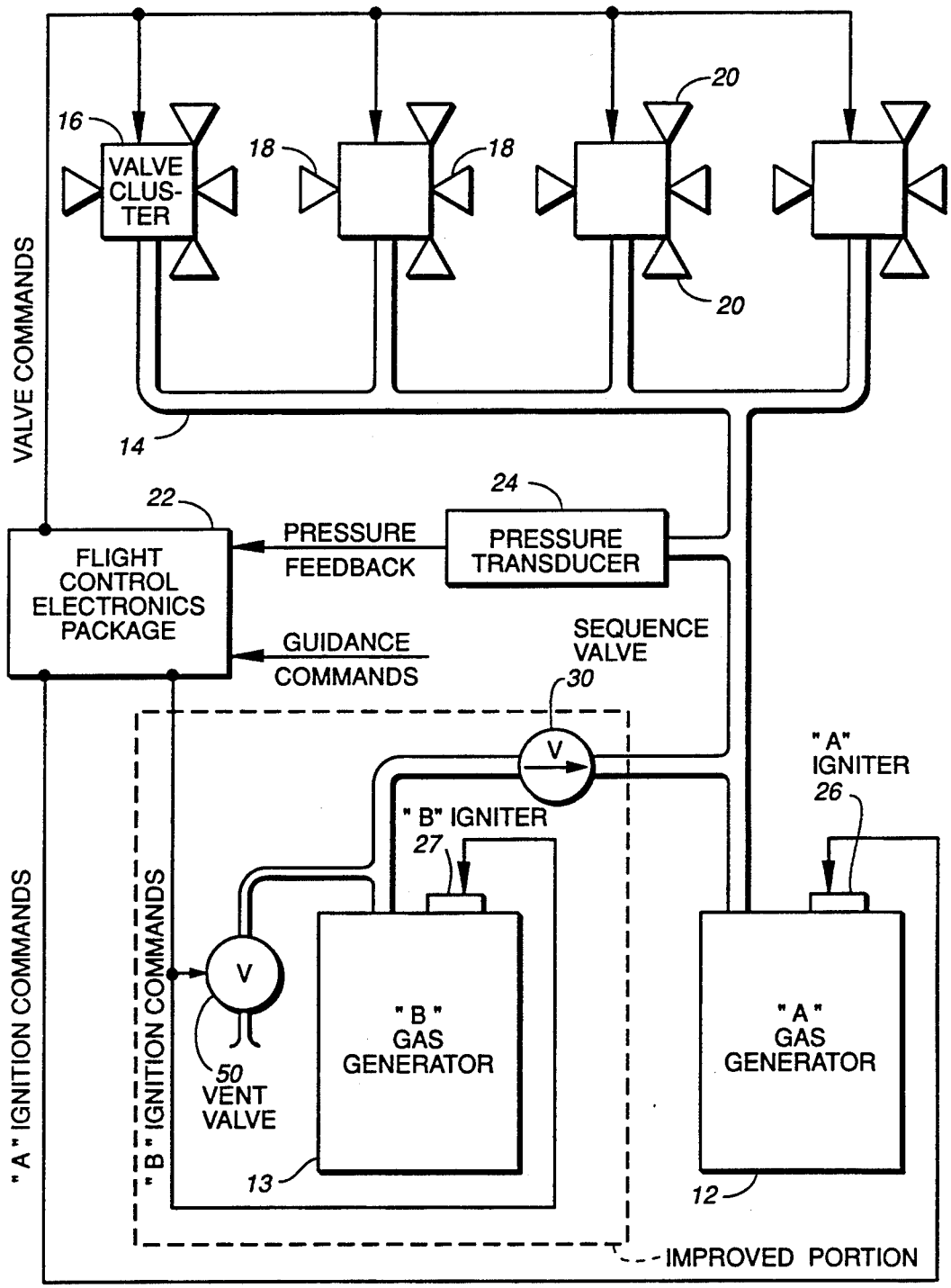
FIG._3

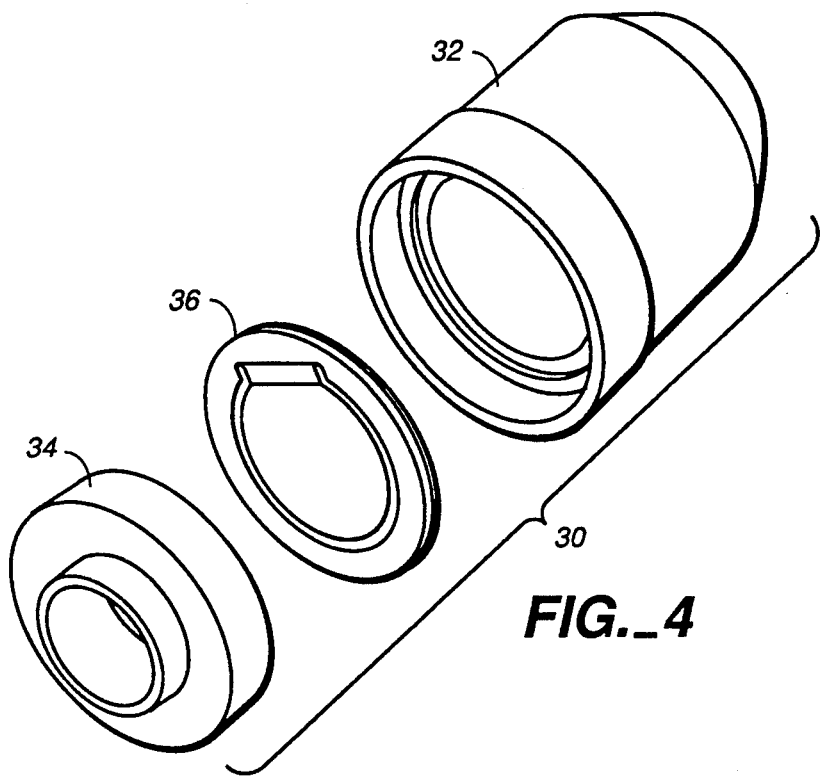
FIG._4
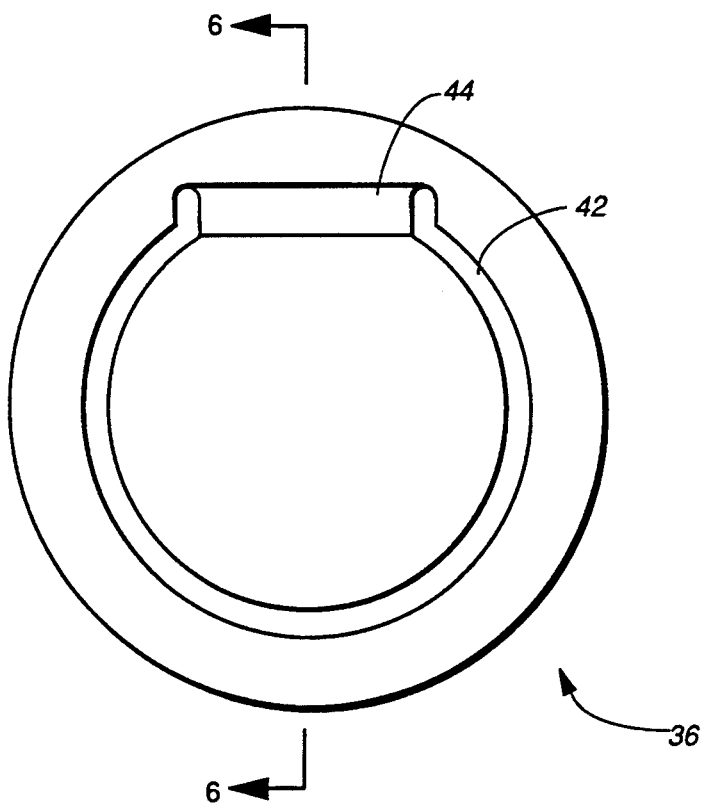
FIG._5
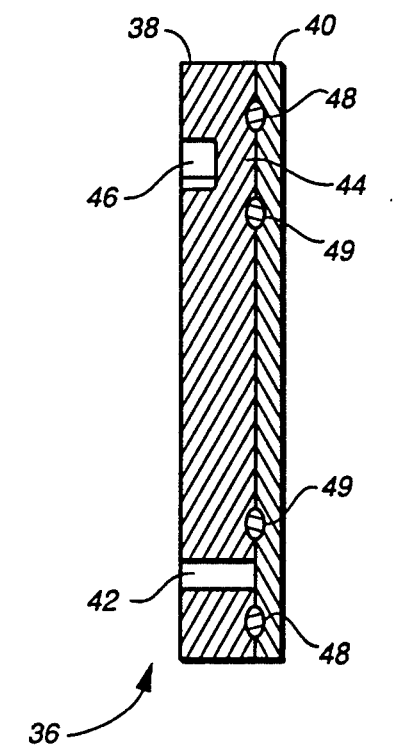
FIG._6

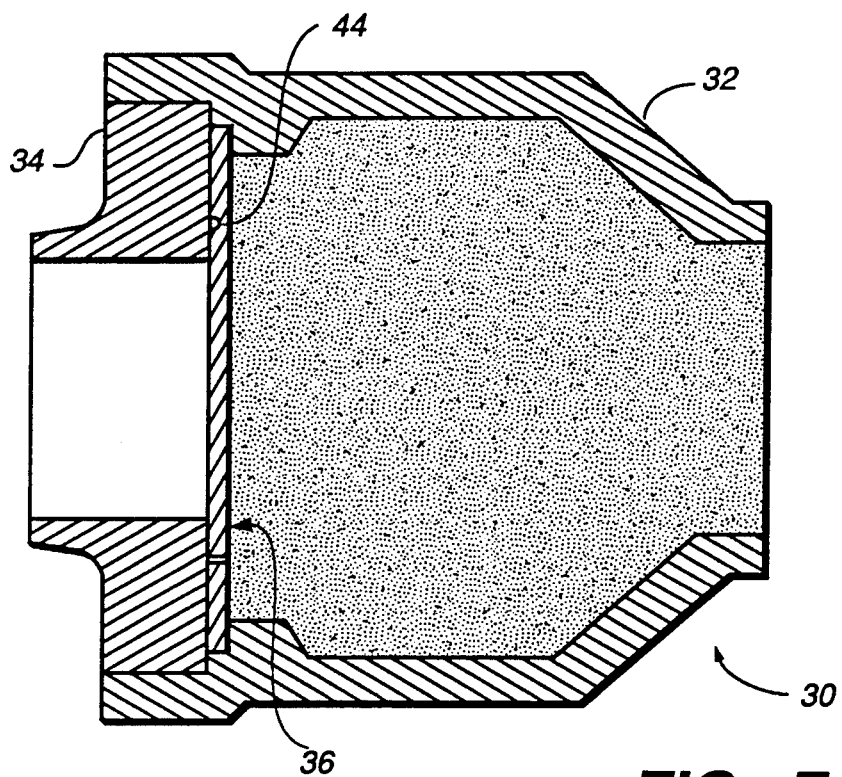
FIG._7
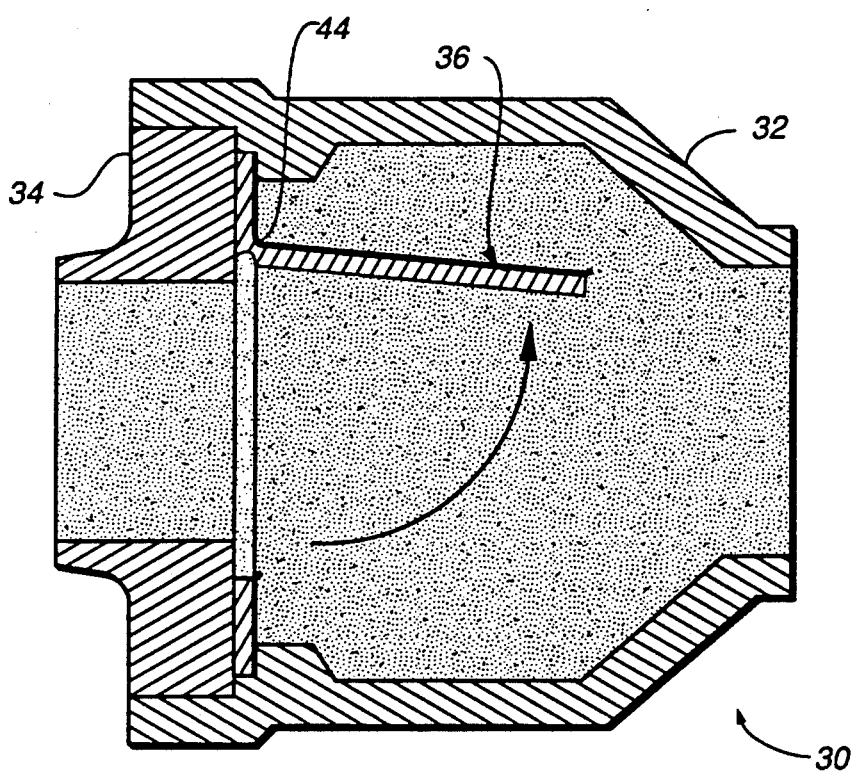
FIG._8

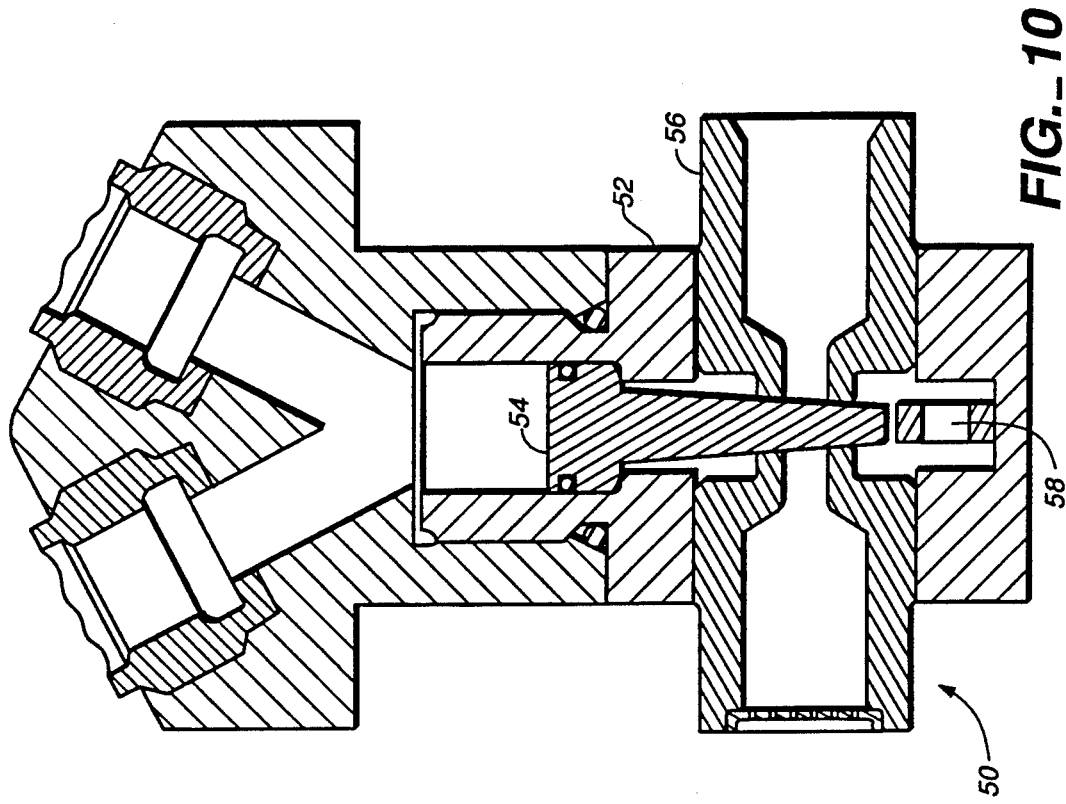
FIG._9
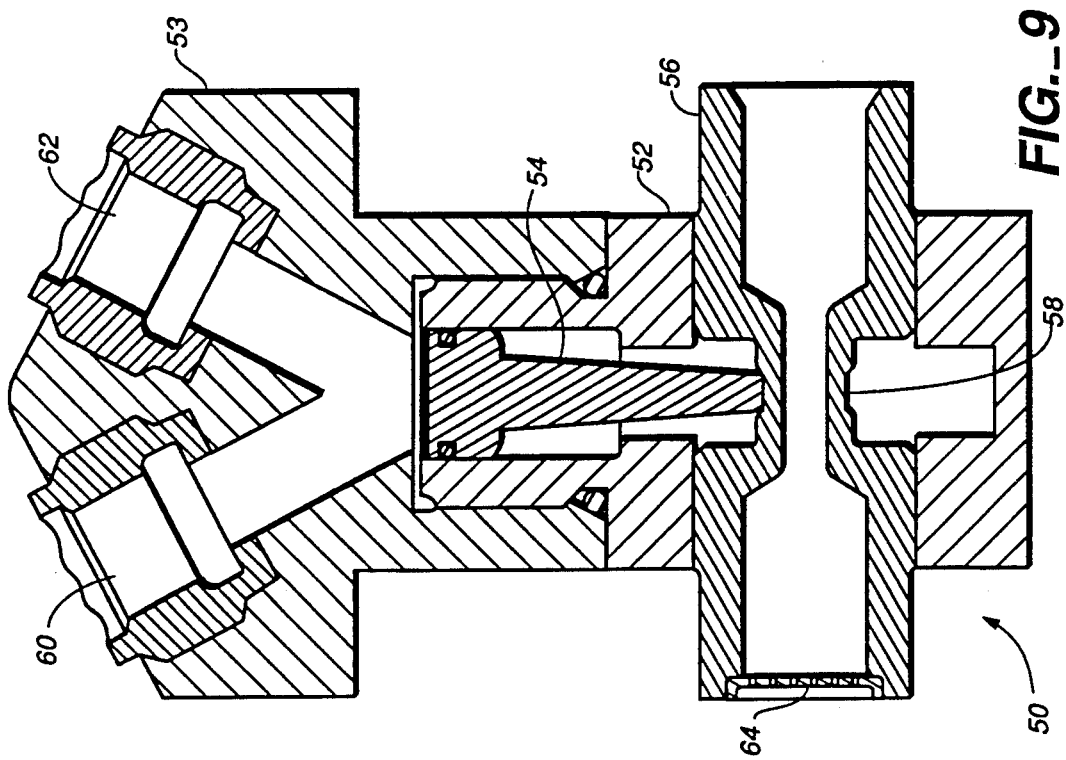
FIG._10

SOLID-PROPELLANT-POWERED MANEUVERING SYSTEM FOR SPACECRAFT

FIELD OF THE INVENTION

The present invention relates to maneuvering systems for spacecraft, and more particularly to an improvement to existing variable-pressure solid-propellant-powered maneuvering systems enabling such systems to operate for longer than one propellant burn time. The term spacecraft as used herein encompasses any aerospace vehicle in free flight above the earth's atmosphere having maneuvering capabilities responsive to flight control commands.

DESCRIPTION OF THE PRIOR ART

An example of a prior-art solid-propellant-powered maneuvering system for spacecraft having nozzle thrust outputs which can be varied is described in U.S. Pat. No. 4,550,888 to Douglass et al. The salient functional components of this example are shown in the schematic drawing labeled prior art (FIG. 2, infra). At least one solid-propellant gas generator directly connected to a manifold provides a hot gas flow to four nozzle valve clusters (each nozzle valve cluster consisting of four nozzle valves, each nozzle valve having an attached thrust nozzle). Each nozzle valve functions in an effectively proportional manner, and is independently controlled to provide an effective variable nozzle exit area for the hot gases. The solid propellant used in each generator has a burn rate that is directly proportional to the gas pressure within the generator; hence higher pressure and greater thrust (due to both higher pressure and to increased mass flow) are obtained when the total exit area (the sum of all the effective nozzle exit areas) is reduced, and conversely a lower burn rate (conserving fuel) and lower thrust is obtained when the total exit area is increased. A pressure transducer output signal provides gas generator pressure information to a flight control electronics package so that it operates the valves to obtain both the desired operating gas pressure (by controlling total exit area) and the desired magnitude and direction of thrust (by controlling which of the valves are open).

A disadvantage of the prior-art maneuvering system is that the gas generator(s), once ignited, burn continuously until all the solid propellant fuel is consumed. Multiple generators (if used) are all connected in parallel, each directly connected to the gas manifold; they are all ignited at one time and all burn together. Even though a lower burn rate is obtained (and hence some fuel is conserved) by enlarging the total nozzle effective area, a minimum pressure (and hence a corresponding fuel consumption rate) must be maintained to assure reliable continuous burning. If thrust is not required during a portion of this low pressure burning time, fuel is consequently wasted.

The acceleration limits that may be imposed by delicate payloads limits the magnitude of thrust that can be imposed, and hence may necessitate longer burn times to achieve a required velocity. Mission requirements may require multiple maneuvering events separated by considerable time intervals. Hence there is a need for a solid-propellant maneuvering system that can be operated for a longer period of time, and also a need for a system that can be operated at distinct intervals widely separated in time. The instant invention provides an improvement to the prior-art maneuvering system so as to overcome this disadvantage and to satisfy these needs.

OBJECTS, FEATURES, AND ADVANTAGES

It is an object of the present invention to provide an improved solid-propellant-powered maneuvering system capable of operating for a longer time than the duration of a single gas generator burn.

It is another object of the present invention to provide an improved solid-propellant-powered maneuvering system capable of operating at distinct intervals widely separated in time.

It is yet another an object of the present invention to provide an improved solid-propellant-powered maneuvering system that will reduce the amount of wasted fuel.

It is a feature of the present invention to use at least two solid propellant gas generators.

It is another feature of the present invention to connect at least one solid propellant gas generator to the gas manifold via a burst diaphragm sequence valve (which functions as a one-time check valve).

It is an advantage of the present invention that sequential burning of the multiple gas generators can be accomplished, thereby providing an uninterrupted gas output continuing over an extended period of time.

It is yet another advantage of the present invention that separately spaced individual burning of gas generators can be accomplished, thereby providing maneuvering capabilities at widely spaced time intervals.

SUMMARY OF THE INVENTION

Accordingly, the present invention provides an improvement to prior-art variable-pressure solid-propellant-powered maneuvering systems for spacecraft, providing means for such a system to operate for a longer period of time than the duration of one gas generator propellant burn (by sequentially burning gas generators), and also providing means for the system to operate at distinct time periods (by separately spacing individual burning of gas generators).

At least two solid propellant gas generators are connected via a manifold to a plurality of nozzle valve clusters. At least one of the gas generators is directly connected to the manifold, and at least one is connected to the manifold via a sequence valve which isolates that generator from the manifold until such time as it is desired to put that generator into operation. When it is desired to put the isolated gas generator into operation, it is ignited and the gas pressure acting on the upstream side of the sequence valve causes the isolating diaphragm within the sequence valve to rupture, thereby admitting the gas into the manifold.

BRIEF DESCRIPTION OF THE DRAWINGS

FIG. 1 is a perspective view of the basic gas-conducting components of the improved solid-propellant-powered maneuvering system, configured as if mounted on a spacecraft (the generalized spacecraft 10 represented by a dashed outline).

FIG. 2, labeled prior art, is a schematic drawing of components of the maneuvering system previously described under the section entitled "Description of the Prior Art."

FIG. 3 is a schematic drawing which includes all the components shown in FIG. 2, and additionally includes the new components of the improvement which are enclosed within a dashed outline.

FIG. 4 is an exploded perspective view of a burst diaphragm sequence valve assembly.

FIG. 5 is a view (looking in the direction of gas flow) of the burst diaphragm assembly of the sequence valve shown in FIG. 4.

FIG. 6 is a cross-sectional view of the burst diaphragm assembly, taken along line 6—6 in FIG. 5; the thickness is exaggerated in order to illustrate the details of construction.

FIG. 7 is a cross-sectional view of the sequence valve with the burst diaphragm intact (with no gas flowing through the valve), the shaded portion representing gas under static pressure from an operating downstream gas generator pushing in the upstream direction against the burst diaphragm assembly.

FIG. 8 is a cross-sectional view of the sequence valve with the burst diaphragm ruptured and fully open, the shaded portion here representing gas under pressure flowing from the upstream operating gas generator associated with that particular sequence valve.

FIG. 9 is a cross-sectional view of a vent valve, which can be used to vent a sequence-valve-isolated gas generator interior to the atmosphere (in order to relieve exterior pressure that could tend to crush a sealed gas generator); it is shown in the open (venting) position.

FIG. 10 shows the vent valve of FIG. 9 as it would appear after being actuated (to close off the venting prior to the gas generator being ignited).

DESCRIPTION OF THE PREFERRED EMBODIMENT

An example of a prior-art solid-propellant-powered maneuvering system for spacecraft having reaction nozzle thrust outputs which can be varied is disclosed in U.S. Pat. No. 4,550,888 to Douglass et al., the disclosure of which is hereby incorporated by reference. The salient functional components of this example are shown in FIG. 2, a schematic drawing labeled prior art; it is summarized as follows.

At least one solid-propellant gas generator 12 provides a hot gas flow via a manifold 14 (if more than one gas generator 12 are used all are simply connected in parallel, each connected directly to the manifold 14) to a plurality of nozzle valve clusters 16 (four nozzle valve clusters 16 are functionally represented by four square boxes in FIG. 2). Each nozzle valve cluster 16 consists of two high-thrust nozzle valves 19 and two low-thrust nozzle valves 21; each nozzle valve 19 or 21 having a corresponding high thrust nozzle 18 or low thrust nozzle 20 attached and fluidly connected thereto as illustrated in FIG. 1. The inlets to the four nozzle valves in each cluster 16 are fluidly connected together to a common nozzle valve cluster inlet port 17 which in turn is fluidly connected to manifold 14. The two high-thrust nozzles 18 in each cluster are mounted back-to-back so that one thrusts in the opposite direction of the other, but both thrust along a common high-thrust-line axis spaced from and parallel to the spacecraft roll axis. The two low-thrust nozzles 20 in each cluster are similarly mounted back-to-back and thrust in opposite directions along a common low-thrust-line axis; the low-thrust-line axis intersects the high-thrust-line axis and is perpendicular to a plane containing both the high-thrust-line axis and the spacecraft roll axis. Each nozzle valve 19 or 21 functions in an effectively proportional manner (the low-thrust nozzle valve 21 and the pilot valve portion of the two-stage high-thrust nozzle valve 19 each being essentially an on/off valve that is rapidly cycled between fully-open and completely-closed positions—i.e., operated in a pulse duration mode) and is independently controlled to provide an effective variable nozzle exit area for the corresponding attached nozzle 18 or 20. The solid propellant used in the gas generator(s) has the property (inherently unstable) of having a burn rate that is directly proportional to the gas pressure within the generator; hence higher pressure and greater thrust (due to both higher pressure and to increased mass flow) are obtained when the total exit area (the sum of all the effective nozzle exit areas) is reduced, and conversely a lower burn rate (conserving fuel) and lower thrust is obtained when the total nozzle area is increased (the relationships being valid within certain operating limits). A pressure transducer 24 output signal provides gas generator pressure information to a flight control electronics package 22 (hereinafter referred to as FCEP 22) so that it operates the valves to obtain both the desired operating gas pressure (by controlling total exit area) and the desired magnitude and direction of thrust (by controlling which of the valves are open). The FCEP 22 receives guidance commands from a guidance system (not shown) which keeps track of the spacecraft velocity, position, attitude, and time of flight; these quantities, along with the mission program stored in the guidance system computer memory, are used to compute guidance commands which feed into the FCEP 22. The FCEP 22 accepts guidance system commands (along with other inputs such as from pressure transducer 24) and then generates commands for controlling the maneuvering system of the spacecraft (e.g., commands such as nozzle valve control commands, and commands to the gas generator ignitors).

The instant invention is an improvement over the above-described prior-art maneuvering system; the schematic drawing FIG. 3 shows the additional functional components (contained within the dashed outline labeled "improved portion") which operate in combination with the above-described prior-art system (components shown in both FIGS. 2 and 3) to form the improved maneuvering system of the present invention. An additional solid propellant gas generator 13 and an associated ignitor 27 (both labeled "B" to easily distinguish from existing generator 12 and associated ignitor 26 labeled "A") is connected to the manifold 14 via a sequence valve 30. The "B" ignitor 27 is connected to the FCEP 22.

FIG. 1 is a perspective view of the basic gas-conducting components of the improved solid-propellant-powered maneuvering system, configured as if mounted on a spacecraft 10 (the generalized spacecraft 10 represented by a dashed outline). The flight direction of the spacecraft 10 is indicated by the arrow labeled "flight direction", which is aligned (conventionally) with the spacecraft 10 roll axis (so labeled); the pitch and yaw axes (each so labeled) are oriented (again conventionally) mutually orthogonally to the roll axis and to each other. The manifold 14 is shown as being of a circular configuration, with radial portions extending outward to each cluster of two high-thrust nozzle valves 19 and two low-thrust nozzle valves 21. The lower gas generator 12 is shown connecting directly to manifold 14; the upper gas generator 13 is shown as connecting to manifold 14 through the sequence valve 30.

In operation, the FCEP 22 first generates a command to fire the "A" ignitor 26 which in turn ignites the "A"

gas generator 12, which is utilized until its solid propellant fuel is exhausted. The sequence valve 30 isolates the "B" gas generator 13 from hot gases in the manifold 14 that could otherwise cause it to ignite. When the FCEP 22 receives a combination of (1) a low gas pressure signal (indicated by a pressure feedback signal from pressure transducer 24) and (2) a guidance command to perform maneuvers, and when its internally generated ignition block (described below) has expired, the FCEP 22 then generates a command to fire the "B" ignitor 27 which in turn ignites the "B" gas generator 13. The gas pressure generated by the "B" gas generator 13, acting on the upstream side of the burst diaphragm sequence valve 30, causes the diaphragm 40 within the sequence valve 30 to rupture and the burst diaphragm assembly 36 to swing open as shown in FIG. 8, thereby admitting the gas generated into the manifold 14.

As the burn rate of the propellant is proportional to pressure, integration of the product of pressure and time is used (in the FCEP 22) to give an indication of the amount of propellant fuel burned. This information is used by the FCEP 22 as a safety measure to block a false signal to ignite the "B" generator 13 until after the "A" generator 12 has had time to burn out.

The general construction of a burst diaphragm sequence valve 30 is illustrated in FIGS. 4 through 6. FIG. 4 shows the three main portions of the valve; the sequence valve body 32, the inlet cap 34, and the burst diaphragm assembly 36. The details of the two-part burst diaphragm assembly 36 are shown in FIGS. 5 and 6. The thin diaphragm 40 is attached to the back pressure support plate 38 by two concentric circles of electron-beam welds, outer circular weld 48 and inner circular weld 49. These two welds serve to both attach diaphragm 40 to plate 38 and to prevent gas from flowing through the semi-circular slot 42 that extends through plate 38. A groove 46 cuts across plate 38 connecting the two ends of semi-circular slot 42 to form a flexural hinge 44. All parts of the sequence valve 30 are made of columbium alloy C-103 and are welded together to form an assembly that, when closed (as shown in FIG. 7) provides a tight seal against gases tending to flow upstream into "B" gas generator 13.

In some applications completely sealing off a gas generator could prove to be detrimental. Gas generator housings are generally designed as internally pressurized vessels, and an existing old-design vessel that is sealed off completely by a sequence valve may not be able to withstand external pressures that it could be subjected to (for example, in storage or during launch). New designs could take such external pressures into consideration and be made structurally adequate; however corrective measures may need to be taken when using existing vessels. One such measure could be to pressurize completely-sealed-off gas generators with an inert gas to an internal pressure level higher than any expected external pressure. Another such measure could be to utilize a vent valve to vent the interior of a gas generator to the exterior atmosphere (although the sequence valve still seals it off from the manifold). Such a vent valve would have to be closed prior to igniting the generator. Shown in FIG. 9 is an example of a vent valve 50 designed for reliable closing. A gate wedge 54, powered by gas generated by two (for redundancy) pyrotechnic squibs 60 and 62 located in the cap 53, is driven downwards in the body 52 to completely sever the necked-down portion 58 of insert 56, through which venting to the atmosphere takes place via screen 64.

FIG. 9 shows the gate 54 in the raised (venting) position; FIG. 10 shows the position of the gate 54 and severed portion 58 of the insert 56 after the valve has been operated and is wedged closed. The pyrotechnic squibs 60 and 62 (shown broken away) would be operated by a command from FCEP 22 prior to sending an ignition command to "B" ignitor 27.

Although the above description contains many specificities these should not be construed as limiting the scope of the invention, to which variations and improvements may be made without departing from the scope of protection of the present patent and true spirit of the invention, but rather as an exemplification of one preferred embodiment thereof. For example, the single "A" and "B" gas generators illustrated could be replaced by a set of "A" generators and a set of "B" generators, each "B" generator having a particular sequence valve associated with it. The entire "A" set could be ignited at once, followed by igniting the entire "B" set at once. Another example could ignite more than just two individual or two sets of generators in sequence (e.g., using "A", "B", and "C" generators or sets of generators to be ignited at different times).

Accordingly, the scope of the invention should be determined not by the embodiment illustrated, but by the appended claims and their legal equivalents.

That which is claimed is:

1. In combination with a solid-propellant-powered maneuvering system for spacecraft having (1) a first gas generator set for providing a hot gas output said first set consisting of at least one gas generator each generator containing solid propellant and having an ignition means responsive to an ignition command, the burn rate of said propellant being directly related to the pressure of said gas output so that the rate of said gas output is directly related to the pressure of said gas output, (2) at least three nozzle valve clusters disposed to be mounted on the spacecraft and radiosymmetrically arranged about the spacecraft roll axis, each nozzle valve cluster having a first and a second high thrust nozzle valve having a corresponding first and second high thrust nozzle attached and fluidly connected thereto the first high thrust nozzle oriented to produce thrust in a direction along and defining a high-thrust-line axis and the second high thrust nozzle oriented to produce thrust in a direction directly opposite to that of the first high thrust nozzle and along said high-thrust-line axis which is spaced from and is parallel to said roll axis, and each nozzle valve cluster also having a first and a second low thrust nozzle valve having a corresponding first and second low thrust nozzle attached and fluidly connected thereto the first low thrust nozzle oriented to produce thrust in a direction along and defining a low-thrust-line axis and the second low thrust nozzle oriented to produce thrust in a direction directly opposite to that of the first low thrust nozzle and along said low-thrust-line axis which intersects said high-thrust-line axis and is perpendicular to a plane containing both said high-thrust-line axis and said roll axis, each nozzle valve having means for individually operating in response to valve commands, (3) a gas conducting manifold fluidly connecting each gas generator of said first gas generator set to each nozzle valve cluster inlet port, (4) a gas pressure transducer fluidly connected to said manifold, and (5) command generating means responsive to guidance command inputs and resposive to pressure feedback from said gas pressure transducer for generating valve commands to individual nozzle valves and for generating ignition commands to individual gas generator ignitors, the improvement which comprises:
  a second gas generator set for providing a hot gas output said second set consisting of at least one gas generator each generator containing solid propellant and having an ignition means responsive to an ignition command, the burn rate of said propellant being directly related to the pressure of said gas output so that the rate of said gas output is directly related to the pressure of said gas output; and
  a set of sequence valves equal in number to the number of gas generators of the second gas generator set, each sequence valve uniquely associated with a particular gas generator of said second set and fluidly connecting that associated gas generator to the gas conducting manifold, each sequence valve installed in a direction to permit gas flow from the associated gas generator into said manifold.

2. In combination with a solid-propellant-powered maneuvering system for spacecraft and the improvement as recited in claim 1, the improvement further comprising a set of vent valves equal in number to the number of gas generators of the second gas generator set, each vent valve having actuating means responsive to a closing command from said command generating means, each vent valve uniquely associated with a particular gas generator of said second set and fluidly connecting with and venting the interior of that associated gas generator to the atmosphere, whereby the associated gas generator is vented to the atmosphere until the vent valve is closed off prior to the igniting of the associated gas generator.

3. In combination with a solid-propellant-powered maneuvering system for spacecraft having (1) a first gas generator set for providing a hot gas output said first set consisting of two gas generators each generator containing solid propellant and having an ignition means responsive to an ignition command, the burn rate of said propellant being directly related to the pressure of said gas output so that the rate of said gas output is directly related to the pressure of said gas output, (2) four nozzle valve clusters disposed to be mounted on the spacecraft and radiosymmetrically arranged about the spacecraft roll axis, each nozzle valve cluster having a first and a second high thrust nozzle valve having a corresponding first and second high thrust nozzle attached and fluidly connected thereto the first high thrust nozzle oriented to produce thrust in a direction along and defining a high-thrust-line axis and the second high thrust nozzle oriented to produce thrust in a direction directly opposite to that of the first high thrust nozzle and along said high-thrust-line axis which is spaced from and is parallel to said roll axis, and each nozzle valve cluster also having a first and a second low thrust nozzle valve having a corresponding first and second low thrust nozzle attached and fluidly connected thereto the first low thrust nozzle oriented to produce thrust in a direction along and defining a low-thrust-line axis and the second low thrust nozzle oriented to produce thrust in a direction directly opposite to that of the first low thrust nozzle and along said low-thrust-line axis which intersects said high-thrust-line axis and is perpendicular to a plane containing both said high-thrust-line axis and said roll axis, each nozzle valve having means for individually operating in response to valve commands, (3) a gas conducting manifold fluidly connecting each gas generator of said first gas generator set to each nozzle valve cluster inlet port, (4) a gas pressure transducer fluidly connected to said manifold, and (5) command generating means responsive to guidance command inputs and responsive to pressure feedback from said gas pressure transducer for generating valve commands to individual nozzle valves and for generating ignition commands to individual gas generator ignitors, the improvement which comprises:
  a second gas generator set for providing a hot gas output said second set consisting of two gas generators each generator containing solid propellant and having an ignition means responsive to an ignition command, the burn rate of said propellant being directly related to the pressure of said gas output so that the rate of said gas output is directly related to the pressure of said gas output; and
  a set of two sequence valves, each sequence valve uniquely associated with a particular gas generator of said second set and fluidly connecting that associated gas generator to the gas conducting manifold, each sequence valve installed in a direction to permit gas flow from the associated gas generator into said manifold.

4. In combination with a solid-propellant-powered maneuvering system for spacecraft and the improvement as recited in claim 3, the improvement further comprising a set of two vent valves, each vent valve having actuating means responsive to a closing command from said command generating means, each vent valve uniquely associated with a particular gas generator of said second set and fluidly connecting with and venting the interior of that associated gas generator to the atmosphere, whereby the associated gas generator is vented to the atmosphere until the vent valve is closed off prior to the igniting of the associated gas generator.

* * * * *